J. PARKER.
SPEED CHANGING AND REVERSING MECHANISM.
APPLICATION FILED JULY 31, 1912.

1,170,097.

Patented Feb. 1, 1916.

Witnesses
J. H. Thurston
C. G. Bradley

Inventor
John Parker,
By Kolmarth H. Thurston,
Attorney

J. PARKER.
SPEED CHANGING AND REVERSING MECHANISM.
APPLICATION FILED JULY 31, 1912.

1,170,097.

Patented Feb. 1, 1916.
3 SHEETS—SHEET 2.

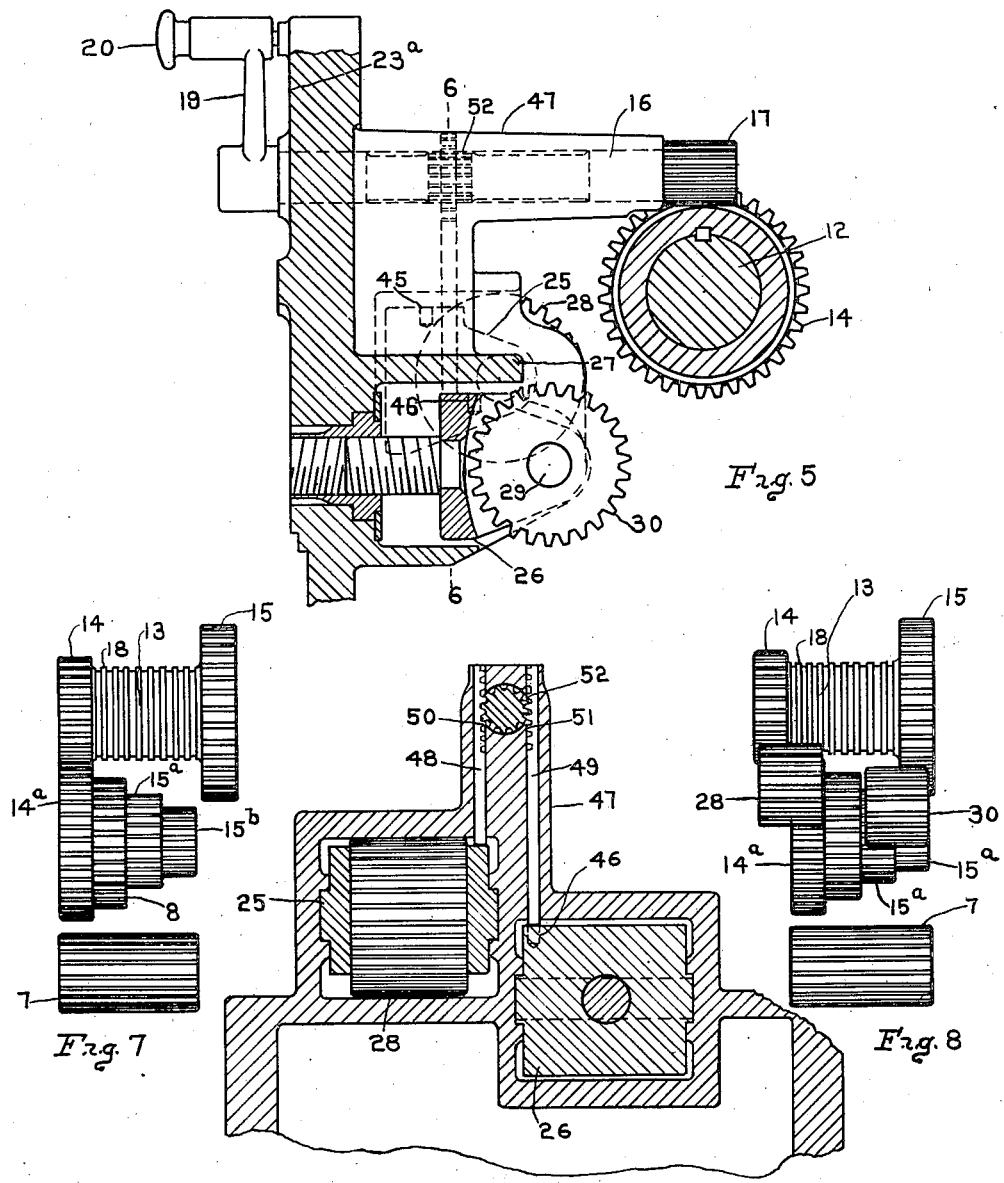

UNITED STATES PATENT OFFICE.

JOHN PARKER, OF PROVIDENCE, RHODE ISLAND, ASSIGNOR TO BROWN & SHARPE MANUFACTURING COMPANY, OF PROVIDENCE, RHODE ISLAND, A CORPORATION OF RHODE ISLAND.

SPEED CHANGING AND REVERSING MECHANISM.

1,170,097.   Specification of Letters Patent.   Patented Feb. 1, 1916.

Application filed July 31, 1912.  Serial No. 712,392.

*To all whom it may concern:*

Be it known that I, JOHN PARKER, of the city and county of Providence and State of Rhode Island, have invented certain new and useful Improvements in Speed Changing and Reversing Mechanism; and I do hereby declare the following specification, taken in connection with the accompanying drawings, forming a part of the same, to be a full, clear, and exact description thereof.

The present invention relates to a speed-changing mechanism and has for its object to provide such speed-changing mechanism with means for reversing the direction of rotation of the driven member.

A further object of the invention is to provide means whereby the driven member may be rotated in the reverse direction at different speeds.

The invention consists primarily in the combination, with driving and driven members of a speed-changing mechanism, of a gear movable into and out of engagement with said driving and driven members, whereby said driven member may be rotated in a reverse direction.

The invention further consists in the combination, with driving and driven members of a speed changing mechanism, of a gear movable into and out of engagement with said driving and driven members, and means for controlling the position of said gear.

The invention further consists in the combination, with engaging driving and driven members of a speed changing mechanism, of means for disengaging said members, and a gear adapted to be moved into and out of engagement with said driving and driven members when said members are disengaged from each other.

The invention further consists in the combination, with driving and driven members of a speed-changing mechanism, of two gears, each movable into and out of engagement with said driving and driven members, whereby said driven member may be rotated in a reverse direction at a correspondingly greater number of speeds.

The invention further consists in the construction, arrangement, and combinations of parts hereinafter described and claimed.

Figure 1:
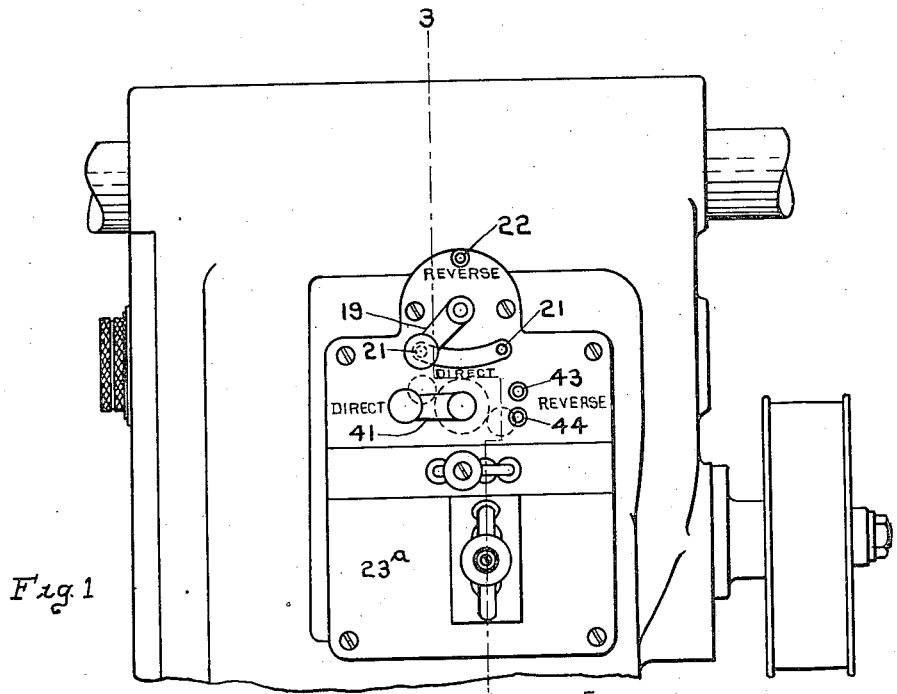
Figure 4:
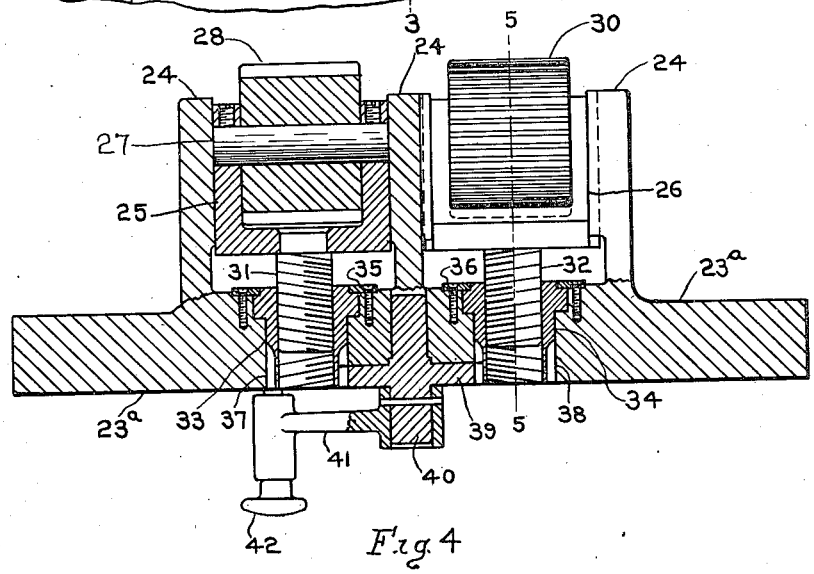
Figure 2:
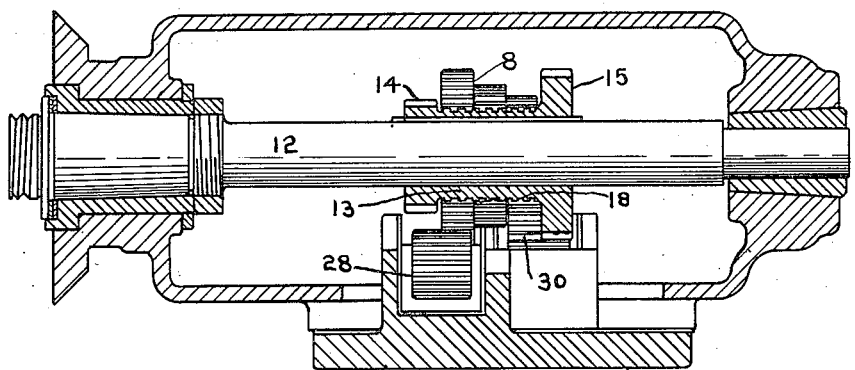
Figure 3:
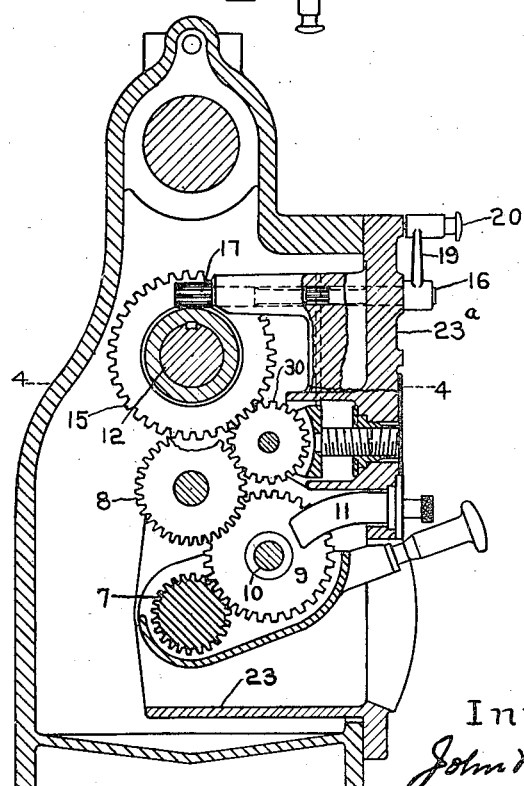

Referring now to the drawings, Figure 1 is a side elevation of a portion of a milling machine embodying the invention. Fig. 2 is a horizontal section through the spindle of the machine. Fig. 3 is a vertical section on the line 3—3 of Fig. 1. Fig. 4 is a transverse section on the line 4—4 of Fig. 3, but on a larger scale. Fig. 5 is a vertical section on the line 5—5 of Fig. 4. Fig. 6 is a vertical section on the line 6—6 of Fig. 5. Fig. 7 shows the gear connections for the forward rotation. Fig. 8 shows the gear connections for the reverse rotation.

In the drawings the invention is shown as applied to a milling machine, but it will be understood that the invention is applicable in connection with any driven shaft where it is desired to change the speed of said shaft and also to reverse the direction of rotation thereof.

The speed changing mechanism in connection with which the present invention is shown in the drawings as being employed is fully shown and described in Letters Patent, No. 855,068, dated May 28, 1907, granted to me, and such speed-changing mechanism therefore need be only briefly described in this connection.

The speed changing mechanism comprises an elongated gear or pinion 7, a cone-gear 8, which in the construction shown constitutes the driving member hereinbefore referred to, and a tumbler gear 9 arranged to be shifted along its shaft 10, and so that said tumbler gear may be brought into engagement with any one of the gears of the cone-gear. A fork 11 engages the tumbler gear for shifting the same along its shaft. By shifting the tumbler gear to bring the same in alinement with one or the other of the gears of the cone-gear, and swinging the tumbler gear into engagement with the gear of the cone-gear with which it has thus been brought into alinement, the speed of the spindle 12 will be correspondingly changed or varied.

In the present construction, as in that shown in the patent referred to, means are provided for doubling the number of speeds which may be obtained for the spindle, such means comprising a quill-gear 13 splined to the spindle 12, through which quill-gear rotation is imparted to the spindle. In the construction shown said quill-gear 13 constitutes the driven member hereinbefore referred to. The small gear 14 of the quill-gear is adapted to be brought into engagement with the largest gear 14ª of the cone-gear, and the large gear 15 of the quill-gear is adapted to be brought into engagement with next to the smallest gear 15ª of the cone-gear, the quill-gear being slidable on the spindle to bring one or the other of said gears into engagement. When the quill-gear is moved to a position in which the large gear 15 is in alinement with the smallest gear 15ᵇ of the cone-gear, there will be no engagement between said gears, and as at this time the gear 14 of the quill-gear will have been moved out of line with the largest gear 14ª of the cone-gear, there will be no engagement between the quill-gear and the cone-gear, the quill-gear being at this time in what may be termed a neutral position, as shown in Fig. 8.

A shaft 16 is provided at its inner end with a pinion 17 which engages a rack 18 formed on the hub of the quill-gear. Said shaft 16 is provided at its outer end with an operating arm 19, by means of which said shaft may be turned in one direction or the other to shift the position of the quill-gear. The operating arm 19 is preferably provided with a spring-pressed pin 20 adapted to engage one or the other of two holes 21, according to which of the gears 14, 15 is brought into engagement with the cone-gear. By the employment of said quill-gear the spindle may be driven at either of two speeds for each speed of the cone-gear, and so that said spindle may thus be driven at any one of eight different speeds with four gears in the cone-gear, as shown in the drawings. A hole 22 is provided, which is adapted to be engaged by the spring-pressed pin 20 when the quill-gear is shifted to its neutral position.

When the quill-gear is in its neutral position, and so that there is no direct engagement between the quill-gear and the cone-gear, it is evident that if an intermediate gear be brought into engagement with said cone-gear and said quill-gear, thereby forming an indirect connection between said gears, the direction of rotation of the quill-gear, and consequently of the spindle, will be reversed as compared with the direction of rotation when there is a direct connection between the cone-gear and the quill-gear. As shown in the drawings, such an intermediate gear is provided, together with means for moving the same into and out of engagement with both the cone-gear and the quill-gear, and so as thus to make connection between the cone-gear and the quill-gear through such intermediate gear. By providing two such intermediate gears, one adapted to be brought into engagement with the gear 14 of the quill-gear and the other to be brought into engagement with the gear 15 of the quill-gear, it is evident that the number of reverse speeds will be thereby doubled, and so that with four gears in the cone-gear eight reverse speeds will be obtained, being thus the same number as in the case of the forward speeds.

The elongated gear 7, cone-gear 8, and tumbler-gear 9 and their shafts are all mounted in a box or casing 23 adapted to be inserted through an opening in the side wall of the frame of the machine, said casing being provided with extended flanges, which in connection with the front wall of the casing itself constitute a cover-plate 23ª for said opening. Extending inwardly from said cover-plate are guides 24, 24, 24 provided with suitable guide-ways on which are mounted two carriages 25, 26, said carriages being adapted to slide forward and back upon said guide-ways. Secured in the carriage 25 is a shaft 27 upon which is loosely mounted a gear 28, and secured in the carriage 26 is a shaft 29 upon which is loosely mounted a gear 30. The gear 28 is adapted to be moved into and out of engagement with the small gear 14 of the quill-gear and the gear 14ª of the cone-gear, while the gear 30 is adapted to be moved into and out of engagement with the large gear 15 of the quill-gear and gear 15ª of the cone-gear. The means for thus moving said gears 28 and 30 into and out of engagement with the quill-gear and cone-gear in the construction shown are as follows: Secured to the carriage 25 and extending outward therefrom is a screw 31 and secured to the carriage 26 is a corresponding screw 32, the screw 31 in the construction shown being a left hand screw and the screw 32 a right hand screw. Mounted in the cover-plate 23, and so as to be capable of rotation therein are two nuts 33 and 34, the nut 33 being arranged to engage the screw 31 and the nut 34 to engage the screw 32. The nut 33 is held in place in the cover-plate by an annular ring 35 secured to said cover-plate, and the nut 34 is likewise held in place in the cover-plate by a corresponding annular ring 36. The outer end of the nut 33 is provided with gear-teeth to form a gear 37, while the outer end of the nut 34 is provided with a similar gear 38. Intermediate the gears 37 and 38 and engaging both of the said gears is a gear 39 secured to a short shaft 40 mounted in suitable bearings in the cover-plate. Secured to the outer end of said shaft 40 is an operating arm 41. Said arm 41 is preferably provided with a spring-pressed pin 42 adapted to engage holes 43, 44 to hold said operating arm in one position or the other.

The operation of the mechanism above described is as follows: Assuming the gear 14 of the quill-gear to be in engagement with the gear 14ª of the cone-gear for the forward rotation of the spindle, as shown in Fig. 7, the operating arm 19 will be in the position shown in Fig. 1. When now it is desired to rotate said spindle in the reverse direction the operating arm 19 is moved into position where its pin will enter the hole 22, which will serve to move the quill-gear into neutral position, thereby breaking the engagement between said quill-gear and the cone-gear by means of which the spindle has been rotated in the forward direction. The operating arm 41 is then moved in one direction or the other, according to which of the two gears 28, 30, it is desired to bring into engagement with the quill-gear and the cone-gear. Assuming that it is the gear 28 which is to be thus moved into engagement with the quill-gear and cone-gear, the operating arm 41 will be moved from the position shown in Fig. 1 around to a position where the spring-pressed pin 42 will engage the hole 43. If, on the other hand, it be desired to move the gear 30 into engagement with the quill-gear and the cone-gear, then the operating arm 41 will be moved from the position shown in Fig. 1 in the opposite direction and around to a position where the spring-pressed pin 42 will engage the hole 44.

As will be seen, with the construction shown, when the operating arm 41 is turned in a direction to move the gear 28 inward, the gear 30 will, through the gear connections, be moved outward, and vice versa, and that when the operating arm 41 is moved to the position shown in Fig. 1 both gears 28, 30 will be moved to mid-position and thus out of engagement with the quill-gear and cone-gear.

As will be evident, when the gear 28 is moved inward to engage the small gear 14 of the quill-gear and the largest gear of the cone-gear, one set of reverse speeds will be provided for, while when the gear 30 is moved into engagement with the large gear 15 of the quill-gear and next to the smallest gear of the cone-gear, another set of reverse speeds will be provided for. It will be further seen that each of the two gears 28 and 30 has a width of face equal to that of two gears on the cone, as shown in Fig. 8, and so that, notwithstanding that when the quill-gear is moved to neutral position the gear 14 is out of line with the largest gear of the cone-gear, the gear 28 will nevertheless make connection between said gears, and so that while the gear 15 is to be connected, not with the smallest gear of the cone-gear, but with the next to the smallest gear, the gear 30 will make connection between the same.

It is important that the quill-gear should be moved to and should occupy its neutral position before the gear 28 or the gear 30 is moved inward to connect said quill-gear and said cone-gear, or in other words, it is important that the gear 28 or the gear 30 shall not be moved inward to connect the quill-gear and the cone-gear until it is certain that the quill-gear has been moved to neutral position and the direct connection between the quill-gear and the cone-gear thus broken. Means are therefore provided for insuring that neither the gear 28 nor the gear 30 shall be moved inward to make connection between the quill-gear and the cone-gear until the quill-gear has been moved to its neutral position.

The carriage 25 is provided with a hole 45 and the carriage 26 is provided with a corresponding hole 46. The casing 23 is provided with a boss or projection 47, in which are mounted to reciprocate two locking pins 48 and 49. The pin 48 is provided with a rack 50 and the pin 49 with a rack 51, both of which racks are engaged by an intermediate pinion 52 secured to or formed on the shaft 16.

With this construction when the operating arm 19 is in the position shown in Fig. 1, with the spring-pressed pin 20 in engagement with one of the holes 21, the quill-gear is in one of the positions in which it is in direct engagement with the cone-gear, and both of the carriages 25 and 26 are in their mid-position, as shown in Fig. 4. In bringing the parts to this position the shaft 16 will have been so turned as to move the locking pin 48 downward and into the hole 45 in the carriage 25. With said locking pin 48 thus in locking position the carriage 25 cannot be moved and by reason of the gear connection between the two carriages the carriage 26 likewise cannot be moved, and thus both carriages will be locked in mid-position by said locking-pin. So also, as will be understood, when the operating arm 19 is moved to the opposite position, and so as to bring the spring-pressed pin 20 into engagement with the other hole 21, the shaft 16 and the pinion 52 will be turned and so that thereby the locking pin 48 will be raised and the locking pin 49 will be depressed and caused to enter the hole 46 in the carriage 26, thereby likewise locking both carriages in their mid-position. If now it be desired to reverse the rotation of the spindle 12, the first thing to be done is to shift the quill-gear to its neutral position. This is effected by moving the operating arm 19 to a position where the spring-pressed pin 20 will engage the hole 22. This movement of the arm 19 will impart a rotation to the shaft 16 sufficient to withdraw the locking pin which at the time was in engagement, and will be such as to leave both locking pins out of engagement with the respective carriages 25 and 26, and so that said carriages may thus be moved to bring one or the other of the gears 28 or 30 into engagement with the quill-gear and the cone-gear.

By the construction above described, as will be seen, the carriages 25 and 26 will be locked in mid-position, and the gears 28 and 30 be thus locked in position out of engagement with the quill-gear and the cone-gear, so long as the quill-gear is in direct engagement with said cone-gear, and neither of the gears 28 or 30 can be moved into engaging position until the quill-gear has been moved out of engagement with the cone-gear and into its neutral position. It is likewise important that the quill-gear should not be thrown into direct engagement with the cone-gear so long as either of the reverse gears 28 or 30 is in engagement with said quill-gear and said cone-gear, and by the construction above described means are provided whereby the quill-gear will be prevented from being moved into engagement with the cone-gear so long as either the gear 28 or the gear 30 is in engagement therewith. When either the gear 28 or the gear 30 is in engagement with the quill-gear and the cone-gear, the quill-gear being at this time out of direct engagement with the cone-gear, one of the carriages 25, 26 will be in its inner position while the other carriage will be in its outer position. While at this time both of the locking pins 48, 49 will be withdrawn from engagement with their respective carriages, the ends of both pins will be bearing upon or be in close proximity to the upper surface of its carriage, as shown in Fig. 5. In order to move the quill-gear from its neutral position into a position to directly engage the cone-gear, it is necessary to turn the shaft 16, but so long as either one of the gears 28 or 30 is in engaging position the shaft 16 cannot be turned, because the abutting of the ends of the locking pins 48, 49 against their respective carriages 25 and 26 will prevent the turning of said shaft in either direction, and thus prevent the movement of the quill-gear into engaging position. Thus with the construction above described both the quill-gear on the one hand and the reverse gears on the other hand are each in turn locked in their disengaging positions, and so that neither the quill-gear nor either of the reverse gears can be moved into engaging position until the other has been disengaged, thereby safe-guarding against either gear being prematurely moved into engaging position and preventing the possibility of injury which might in such case result.

What I claim as my invention and desire to secure by Letters Patent is:

1. A speed-changing and reversing mechanism comprising a driving member and a driven member adapted to be engaged one with the other to rotate said driven member in one direction, and two intermediate gears adapted to be alternately moved into engagement with said driving and driven members to rotate said driven member in the reverse direction at one or the other of two different speeds.

2. A speed-changing and reversing mechanism comprising a cone-gear driving member and a quill-gear driven member adapted to be engaged one with the other to rotate said quill-gear in one direction, and two intermediate gears adapted to be alternately moved into engagement with said cone-gear and said quill-gear to rotate said quill-gear in the reverse direction at one or the other of two different speeds.

3. A speed-changing and reversing mechanism comprising a cone-gear driving member and a quill-gear driven member, means for moving said quill-gear into engagement with said cone-gear to enable said quill-gear to be rotated by said cone-gear, two intermediate gears, and means for moving either one of said intermediate gears into engagement with said cone-gear and said quill-gear to rotate said quill-gear in the reverse direction at one or the other of two different speeds.

4. A speed-changing and reversing mechanism comprising a driving gear, a cone-gear, a tumbler-gear adapted to engage said driving gear and said cone-gear, a quill-gear adapted to engage said cone-gear, and an intermediate gear adapted to engage said cone-gear and said quill-gear to rotate said quill-gear in the reverse direction.

5. A speed-changing and reversing mechanism comprising a driving gear, a cone-gear, a tumbler-gear adapted to engage said driving gear and said cone-gear, a quill-gear adapted to engage said cone-gear, and two intermediate gears adapted to engage alternately said cone-gear and said quill-gear to rotate said quill-gear in the reverse direction at one or the other of two different speeds.

6. A speed-changing and reversing mechanism comprising a driving gear, a cone-gear, a tumbler-gear, means for moving said tumbler-gear into and out of engagement with said driving gear and said cone-gear, a quill gear, means for moving said quill-gear into and out of engagement with said cone-gear, an intermediate gear, and means for moving said intermediate gear into and out of engagement with said cone-gear and said quill-gear.

7. A speed-changing and reversing mechanism comprising a driving gear, a cone-gear, a tumbler-gear, means for moving said tumbler gear into and out of engagement with said driving gear and said cone-gear, a quill gear, means for moving said quill-gear into and out of engagement with said cone-gear, two intermediate gears, and means for moving said gears alternately into and out of engagement with said cone-gear and said quill-gear.

8. A speed-changing and reversing mechanism comprising a driving member and a driven member, means for moving said driven member into engagement with said driving member, two carriages, a gear mounted on each of said carriages, and means for reciprocating said carriages to move said gears into and out of engagement with said driving and driven members.

9. A speed-changing and reversing mechanism comprising a cone-gear, a quill-gear, means for moving said quill-gear into engagement with said cone-gear, two carriages, an intermediate gear mounted on each of said carriages and means for reciprocating said carriages to move said intermediate gears into and out of engagement with said cone-gear and said quill-gear.

10. A speed-changing and reversing mechanism comprising a driving member and a driven member, means for moving said driven member into engagement with said driving member, two carriages, an intermediate gear mounted on each of said carriages, and operative connections between said carriages whereby when one carriage is moved toward the driving and driven members the other carriage will be moved away therefrom.

11. A speed-changing and reversing mechanism comprising a driving member and a driven member, two carriages, a gear mounted on each of said carriages, means for moving both of said carriages to mid-position and for moving one of said carriages from said mid-position toward said driving and driven members and for moving the other carriage away therefrom.

12. A speed-changing and reversing mechanism comprising a driving member and a driven member, one of said members being shiftable with relation to the other, two gears movable into and out of engagement with said driving and driven members, and means controlled by the shifting of the shiftable member for locking both of said movable gears out of engagement.

13. A speed-changing and reversing mechanism comprising a quill-gear and a cone-gear, means for shifting the position of said quill-gear with relation to said cone-gear, two gears movable into and out of engagement with said quill-gear and said cone-gear, and means controlled by the shifting of said quill-gear for locking both of said movable gears out of engagement.

14. A speed-changing and reversing mechanism comprising a quill-gear and a cone-gear, means for shifting the position of said quill-gear with relation to said cone-gear, two carriages, a gear mounted on each of said carriages and adapted to be brought into engagement with said quill-gear and said cone-gear, operative connections between said carriages, and means controlled by the shifting of said quill-gear for locking said carriages in position where both of said movable gears will be out of engagement.

15. A speed-changing and reversing mechanism comprising a driving member and a driven member, one of said members being shiftable with relation to the other, two gears movable into and out of engagement with said shiftable member, and means controlled by said movable gears for preventing the shifting of said shiftable member when either of said movable gears is in engagement therewith.

16. A speed-changing and reversing mechanism comprising a cone-gear and a quill-gear, one of said gears being shiftable with relation to the other, two gears movable into and out of engagement with said shiftable gear, and means controlled by said movable gears for preventing the shifting of said shiftable gear when either of said movable gears is in engagement therewith.

17. A speed-changing and reversing mechanism comprising a driving member and a driven member, one of said members being shiftable with relation to the other, two carriages, a gear mounted on each of said carriages, and means controlled by said carriages for preventing the shifting of said shiftable gear when either of said movable gears is in engagement therewith.

18. A speed-changing and reversing mechanism comprising a driving member and a driven member, one of said members being shiftable with relation to the other, a gear movable into and out of engagement with said shiftable member, a shaft for shifting said shiftable member, and means operated by said shaft for locking said movable gear out of engagement when said driving and driven members are in engagement with each other.

19. A speed-changing and reversing mechanism comprising a driving member and a driven member, one of said members being shiftable with relation to the other, a gear movable into and out of engagement with said shiftable member, a shaft for shifting said shiftable member, and means operated by said shaft for holding said shiftable member against movement when said movable gear is in engagement therewith.

20. A speed-changing and reversing mechanism comprising a driving gear and a driven gear, one of said gears being shiftable with relation to the other, two gears movable into and out of engagement with said shiftable gear, a shaft for shifting said shiftable gear, means operated by said shaft for locking said movable gears out of engagement when said driving and driven gears are in engagement with each other, and means operated by said shaft for holding said shiftable gear against movement when either of said movable gears is in engagement therewith.

JOHN PARKER.

Witnesses:
W. H. THURSTON,
J. H. THURSTON.